June 18, 1963  J. ISSLER  3,094,202
ELECTROMAGNETIC CLUTCH ARRANGEMENT
Filed Sept. 29, 1960

INVENTOR
Jörg Issler
BY
Michael S. Striker
attorney

United States Patent Office 3,094,202
Patented June 18, 1963

---

3,094,202
ELECTROMAGNETIC CLUTCH ARRANGEMENT
Jörg Issler, Stuttgart, Germany, assignor to
Robert Bosch G.m.b.H., Stuttgart, Germany
Filed Sept. 29, 1960, Ser. No. 59,409
Claims priority, application Germany Sept. 30, 1959
10 Claims. (Cl. 192—3.5)

The present invention concerns a clutch arrangement, and more particularly an electromagnetic clutch arrangement for engines in motor vehicles.

In conventional clutch arrangements of this type which must be capable of transmitting torques increasing with the increase of the rotary speed of the engine beyond a certain minimum speed the magnet coil of the electromagnetic clutch is connected to a source of energy which consists in the conventional lighting current generator driven by the engine. In such a conventional lighting system the generator is so dimensioned that only after the engine reaches a rotary speed substantially higher than its idling speed, e.g., about twice the idling speed, a voltage output is produced which is proper for connecting the generator with the lighting system, because otherwise the clutch would be placed in engagement already at rotary speeds of the engine which are only slightly above its idling speed. On the other hand, however, the desire of quickly recharging the battery during operation of the motor vehicle, makes it necessary to keep the rotary speed at which the generator reaches the charging voltage of the battery and can be connected with the lighting system, as low as possible. These two conditions are very difficult to reconcile with each other.

Moreover, it is desirable to prevent the occurrence of jolts during the transition from disengaged to engaged condition of the clutch. Therefore an electromagnetic clutch should be capable of transmitting in the low speed range of the engine a torque which only slowly increases with increasing rotary speed.

It is therefore a main object of this invention to provide for a clutch arrangement which satisfactorily complies with the above-mentioned conditions and requirements.

It is a further object of the invention to provide for an electromagnetic clutch of the type set forth which is comparatively simple, sturdy and reliable in operation.

With above objects in view, a clutch arrangement, particularly for engines in motor vehicles, comprises, according to the invention, in combination, electromagnetic clutch means for transmitting variable torques from the engine to the power train of the vehicle, depending upon energization of the clutch means; and pulse generator means for applying pulse sequences to the clutch means for energizing the latter. Preferably, an electrical pulse generator is provided which is actuated at least once during each rotation of the crank shaft of the engine or of a member rotating synchronously therewith, so as to furnish pulses the pulse duration whereof is independent from the actual rotary speed i.e., from the pulse frequency. In a preferred and particularly efficient embodiment of the invention the pulse generator comprises a transistor equipped monostable multivibrator which is triggered by control pulses derived from the high voltage ignition system of the engine.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

Figure 1:
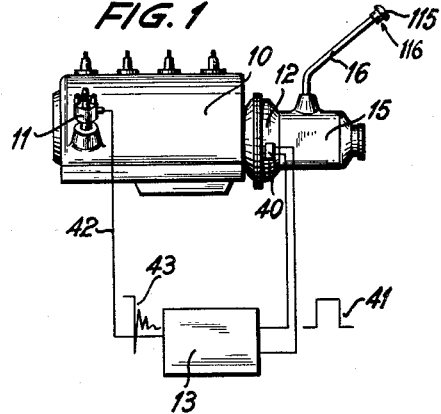
FIG. 1 illustrates diagrammatically a four-cylinder four-stroke internal combustion engine comprising an automatic electromagnetic clutch in an ararngement according to the invention.

The internal combustion engine 10 of FIG. 1, forming the power plant of a motor vehicle, comprises a high voltage ignition system, not shown in detail, only the distributor whereof is illustrated at 11. Mounted at one end of the engine 10 is the housing 12 of an electromagnetic clutch which is operated and controlled by an electric control arrangement 13, illustrated in greater detail by FIG. 3, in such a manner that the clutch is automatically caused to engage whenever the rotary speed of the engine exceeds a predetermined minimum speed greater than the idling speed of the engine. A conventional gear shift assembly 15 is mounted next to the clutch 12 and comprises a gear shift lever 16 for shifting the gears.

Figure 2:
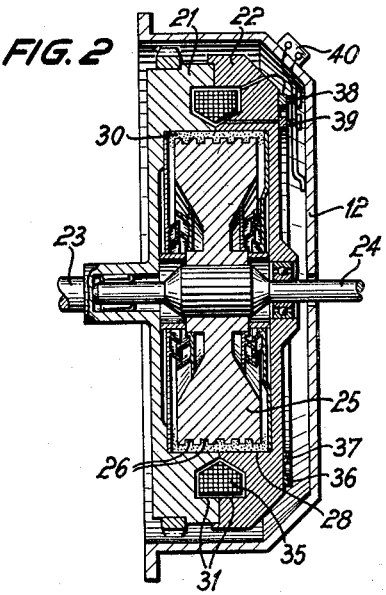
FIG. 2 is a diagrammatic axial section across an electromagnetic clutch as indicated in FIG. 1.

Referring now to FIG. 2, the electromagnetic clutch described by way of example is of the type which utilizes a magnetizable powder as torque-transmitting material. The clutch according to FIG. 2 comprises a rotor 25 mounted on an output shaft 24, and a hollow rotary member composed of an assembly of two shells 21 and 22 rigidly connected with the end of the crank shaft 23 of the engine and serving at the same time as the fly wheel thereof. The rotor 25 is provided on its cylindrical surface with a plurality of adjacent grooves 26. Between this cylindrical surface of the rotor 25 and the cylindrical inner surface 28 of the joined shells 21 and 22 an annular space is provided as shown, which usually has a radical width of .040 to .080 inch. The spaces between the shells 21, 22 and the rotor 25 are filled with a magnetizable powder 30 which is forced into the above-mentioned annular space by centrifugal force when the engine is in operation. The adjacent flat faces of the shells 21 and 22 are each provided with an annular groove 31 tapered toward the axis of rotation and thus forming an annular spaced accommodating the magnet coil 35. The ends of the magnet coil 35 are connected with slip rings 36 and 37 which are insulated from each other and are mounted on the outer face of the shell member 22. Two corresponding brushes 38 and 39, likewise insulated from each other, are mounted on the inner wall of the housing 12. The brushes 38 and 39 cooperate with the slip rings 36 and 37, respectively. The brushes are conductively connected with a terminal block 40 mounted on the outside of the housing 12 and the terminals of the block 40 are connected by cables with the control device 13. As will be explained further below, the control arrangement 13 furnishes the energy for actuating the clutch for the purpose of transmitting a torque, this energy being supplied in the form of approximately rectangular current pulses as indicated at 41 in FIG. 1. For producing these current pulses the input of the arrangement 13 is connected by a cable 42 with the distributor 11 of the high voltage ignition system so that upon the occurrence of every individual ignition a short triggering impulse is applied to the control arrangement 13 as indicated at 43 in FIG. 1.

Figure 3:
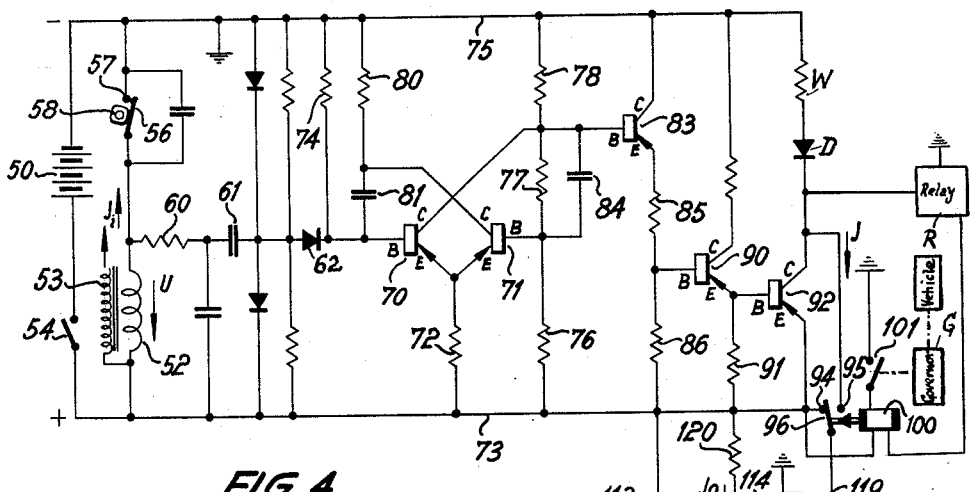
FIG. 3 is a schematic circuit diagram illustrating the control means for operating the clutch of FIG. 2.

As can be seen from the circuit diagram of FIG. 3 the battery 50 provided for operating the high voltage ignition system may be connected with the primary winding 52 and the secondary winding 53 of the ignition coil through an ignition switch 54. The primary winding 52 is connected in series with interrupter contact 56 located in the housing of the distributor 11. The movable arm of the interrupter switch 56 cooperates with a stationary contact 57 and is removed from the contact 57 twice per rotation of the engine by the action of a four-cornered cam member also located within the housing 11 and operated in synchronism with the rotation of the crank shaft. Every time the contact arm 56 interrupts the ignition current $J_1$ flowing through the primary winding 52, a voltage U is induced therein which is, as will be described below, applied to a multivibrator circuit via a resistor 60 and a condensor 61 series-connected therewith.

The above mentioned multivibrator arrangement serves the purpose of furnishing upon application of each of the consecutive igniting impulses 43 caused by the opening of the interrupter contact 56, a current pulse 41 the duration of all of the consecutive impulses 41, being kept at a constant value regardless of the varying rotary speeds of the engine. The multivibrator comprises an input transistor 70 and an output transistor 71. The emitter electrodes of these two transistors are connected with each other and are jointly connected via a resistor 72 with the positive line 73 which contains the ignition switch 54. While the base electrode of the input transistor 70 is connected via a resistor 74 with the grounded negative line 75 and thus keeps the input transistor 70 in conductive condition as long as the interrupter contact 56 is not in engagement with the cooperating stationary contact 57, the output transistor 71 is connected by its base electrode with a voltage divider composed of three series-connected resistors 76, 77 and 78. The collector of the output transistor 71 is connected via a load resistor 80 with the negative line 75 and is additionally connected across a condenser 81 with the base electrode of the input transistor 70. The above mentioned resistor 78 acts as collector resistance for the input transistor 70. The junction point between the voltage divider resistors 77 and 78 is not only connected with the input transistor but also with the base electrode of a third transistor 83, this base electrode being connected with the base electrode of the transistor 71 not only via the resistor 77 but also across a condensor 84 arranged in parallel with the resistor 77. The collector electrode of the transistor 83 is directly connected with the negative line 75. A series-combination of two resistors 85 and 86 is connected between the emitter electrode of the transistor 83 and the positive line 73, and the junction point between the resistors 85 and 86 is connected with the base electrode of a fourth transistor 90. The emitter electrode of the transistor 90 is connected with the positive line 73 via a resistor 91 and also with the base electrode of an output transistor 92 which is dimensioned so as to be capable to supply, assuming that the battery 50 constitutes a source of 6 volts potential, current pulses J to the magnet coil 35, the pulse current J being capable of reaching a peak value of e.g. 15 amperes.

In the output circuit between the output transistor 92 and the magnet coil 35 switching arrangements are provided which serve to meet the following operational requirements:

(a) Even when the engine is not in operation the coupling must (provided battery current is available) go into engaged condition automatically whenever the vehicle, coasting or rolling, moves at a predetermined minimum speed of say 10 miles per hour;

(b) Whenever the gear shift is operated to shift from one gear ratio to another, the coupling must be automatically disengaged shortly before the shifting operation, i.e., whenever the driver of the vehicle operates the shift lever 16 shown in FIG. 1;

(c) In order to obtain a rapid disengagement of the clutch immediately before shifting the gears, the magnetization causing clutch engagement must be rapidly eliminated by opposite magnetization;

(d) When the engine is in operation at least at idling speed, then the circuit for magnetizing the magnet coil in the coupling must be closed so that thereafter varying torques at varying engine speeds are transmitted through the clutch depending upon the current-speed characteristics of the arrangement.

Now the above-mentioned switching arrangement will be described. A first relay is provided having a coil 100 and a movable contact arm 96 operated thereby. The coil 100 is connected between the positive line 73 carrying direct current potential from the battery 50, a normally closed interrupter switch 101 being connected between the coil 100 and ground and being operable by a governor device connected with suitable elements of the vehicle so as to move the switch 101 to open position as soon as the vehicle moves at a predetermined minimum speed of say 10 miles per hour. When under these conditions the switch 101 is opened, the coil 100 is deenergized and the movable contact arm 96 which normally connects the collector of the output transistor 92 via stationary contact 95 with the magnetic coil 35, is moved under the action of a return spring, not shown, into engagement with the other stationary contact 94 for connecting the coil 35 directly with the positive line 73. This condition of the switch 101 and relay contact 96 is illustrated in FIG. 3. Thus, even when the engine is at standstill and no pulses are delivered by the output transistor 92 the clutch would automatically go into engagement whenever the vehicle should be moving at a predetermined minimum speed.

The relay coil 100 is further connected between the positive line 73 and a relay R and thereby to ground, the relay R being controlled by output pulses from the output transistor 92 and has a time characteristic so as to close an energizing circuit for the coil 100 as soon as and as long as pulses are applied to the relay from the output transistor 92. Thus, when the engine is operated and the vehicle is moved at appreciable speeds the effect of the governor controlled switch 101 is eliminated and the contact arm 96 of the relay is kept in engagement with the output terminal 95 as long as the engine is operating.

When the engine has been started and the vehicle is set in motion after standing still the current pulses J furnished from the output transistor 92 are applied at a pulse frequency increasing with the rotary speed of the engine via the above mentioned contact 95 and the contact arm 96 to a stationary contact 110 cooperating with the contact arm 111 of a second switch relay having a coil 113. A second contact arm 112 of this relay, coupled with the arm 111 thereof, engages in the illustrated normal position a grounded stationary contact 114. The magnet coil 35 is connected between the contact arms 111 and 112.

When during the starting operation the rotary speed of the engine is increased beyond its idling speed, the current pulses furnished by the output transistor 92 will produce in the magnet coil 35 a magnetic field increasing with increasing rotary speed and thereby creating in the magnetizable powder filling 30 of the clutch a corresponding increasing engaging force capable of transmitting increasing torques.

Whenever the driver of the vehicle operates the shift lever 16 and depresses the knob 115 thereof in order to switch gears, a switch 116 operable by the knob 115 and connected in the energizing circuit of the relay coil 113 is moved to closed position. The energizing current then flowing from the positive line 73 via the closed switch 116 to ground causes the coil 113 to move the coupled contact arms 111 and 112 into their alternative position in which they will engage the stationary contacts 119 and 118, respectively, whereby the magnet coil 35 is disconnected from the pulse supply from transistor 92 and is instead connected between the positive line 73 and ground since contact 119 is also connected to ground. Consequently, a magnetizing direct current $J_o$ will flow through the coil 35 in a direction opposite to the previously applied pulsating current J. The current $J_o$ serves to demagnetize the magnetic powder 30 in the coupling. The amplitude of this demagnetizing current is determined by the resistor 120 which is so dimensioned that the demagnetizing field generated by the current $J_o$ is just strong enough to remove remanent magnetism in the powder 30 and the adjacent magnetized metal parts, but would not be sufficient for causing sufficient magnetization of the clutch for transmitting any torque. As soon as the knob 115 is released the switch 116 opens again and the contact arms 111 and 112 of the second switch relay can return, under the action of a return spring, not shown, to their normal position shown in FIG. 3 in which the pulses J furnished by the transistor 92 again are capable to flow over the contact arm 111 to the magnet coil 35 and from there over the contact arm 112 and the stationary contact 114 to ground and thus back to the grounded negative line 75.

The operation of the various transistor circuits described above is as follows: As long as the engine is standing still no current flows through the rectifier 62, however, the transistor 70 is kept in conductive condition by a current flowing from its base electrode through resistor 74 as soon as switch 54 is closed. Under these conditions the emitter-collector current of the input transistor 70 creates across the common emitter resistor 72 a voltage drop of 2 volts while across the collector resistor 78 of this transistor a voltage drop of about 3.5 volts develops. Between the collector electrode of the input transistor 70 and the positive line 73 a potential difference of 2.5 volts exists which is divided into equal halves by the resistors 76 and 77 having equal resistances, so that at the base electrode of the output transistor 71 only a potential of 1.25 volts with respect to the positive line 73 is available and that the base electrode of the transistor 71 has a potential which is .75 volts lower than that of its emitter electrode connected with the resistor 72. Under these conditions the transistor 71 is completely blocked and the condenser 81 will be charged to the full potential difference of about 3.5 volts existing between the base electrode of the transistor 70 and the negative line 75. The input transistor 70 being in conductive condition holds the transistor 83 in non-conductive condition. Consequently, under these conditions neither the transistor 90 nor the output transistor 92 are capable of carrying current.

As soon as the interrupter contact arm 56 is moved from the illustrated closing position to open position by the rotation of the cam 58, an inductive counter voltage U is generated across the primary winding 52 of the ignition coil which voltage U raises for a brief period the potential of that coil end which is connected with the resistor 60 to about 30 volts above the potential of the positive line 73. Hereby all the transistors are changed from their prevailing condition to an opposite operative condition. This is due particularly to the fact that the voltage U created upon interruption of the ignition current $J_i$ in the primary coil 52 is applied via the condenser 61 and through the diode 62 in the conductive direction of the latter to the base electrode of the input transistor 70 and thus blocks the latter from being conductive. Thus the voltage drop across the collector resistor 78 disappears and the now appearing potential of 3 volts at the base electrode of the output transistor 71 renders the latter fully conductive. At the same time also the transistors 83, 90 and 92 become conductive. The energy stored previously in the condenser 81 charged to 3.5 volts causes the transistor 70 to remain non-conductive even after the disappearance of the voltage U, until the condenser 81 has discharged its charge across the resistors 74 and 80. When this is done, the transistor 70 automatically returns to its conductive condition and thereby blocks in the above described manner the transistors 83, 90 and 92 until, upon the next movement of the interrupter 56, 57 to open position again a voltage U is generated.

In this manner pulse sequences are produced at a frequency determined by the operation of the interrupter 56, 58 while the duration of the individual pulses is mainly determined by the parameters of the multivibrator arrangement.

Evidently, while a multivibrator composed of transistor circuits has been described by way of example, other control and switch means may be provided comprising relays or electron tubes in a substantially conventional manner, provided that such other arrangements are capable of furnishing upon the application of control impulse sequences depending upon the rotary speed of the engine current or voltage pulses at the same frequency to the magnet coil 35 of the clutch.

No matter which control circuit arrangement is used, it is always advisable to provide, in parallel with the magnet coil 35 of the clutch, a diode serving to attenuate the inductive voltage peaks appearing across the magnet coil upon termination of the individual current pulses J. In the diagram of FIG. 3 such a diode D is shown connected between the collector of the output transistor 92 and the negative line 75.

Figure 4:
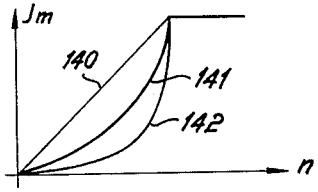
FIG. 4 is a diagram illustrating the relations between the energizing current and the rotary speed of the engine.

It has been found to be highly advisable and advantageous to provide for a favorable ratio between the build-up time constant $T_1$ and the decay time constant $T_2$ of the magnet coil 35. By substantially reducing the decay time constant $T_2$ relative to the build-up time constant $T_1$ a performance characteristic as illustrated in FIG. 4 can be achieved so that the mean current $J_m$ flowing through the magnet coil during the application of pulses J displays the most desirable ratio variation with respect to engine speed. For this purpose the connection from the collector of the output transistor 92 with the negative line 75 contains not only the above-mentioned diode D but additionally a resistor W in series therewith, the resistance of this resistor W being a multiple of the direct current resistance of the magnet coil 35.

It will be appreciated that in an arrangement as described ordinarily the total of build-up time and decay time of the pulse current flowing through the coil will be greater than the actual duration of the pulse or, in other words, the duration of the collector current derived from the output transistor 92. Thus, one would have to expect that, the pulse duration defined by the flow of the collector current being constant irrespective of the pulse frequency, the mean value of the coil current at low speeds i.e., low pulse frequency, is practically equal to the mean value of the coil current at higher speeds, i.e., higher pulse frequencies. However, if the decay time is substantially shortened by the insertion of the resistor W in parallel with the coil 35 the mean value of the coil current at low speeds will be substantially lower in view of a time interval appearing between the end of the decay time and the start of the next following pulse while the mean value of the coil current at higher speeds will be substantially higher in view of the possibility of eliminating a time interval between the end of the decay of one pulse and the start of the build-up of the next pulse. FIG. 4 is illustrative of the variation of the mean value $J_m$ of the coil current derived from the current impulses J in relation to increasing speeds $n$ provided that the ratio $K = T_1/T_2$ is chosen differently. The straight line 140 would apply for $K=1$, the slightly curved line 141 represents $K=2$, while the even more curved line 142 corresponds to $K=4$. It has been found that with values of K between 2 and 10 a very satisfactory performance of the coupling particularly during the starting period is obtainable, because the engagement and torque transmission of the clutch is rather low at low speeds but increases rapidly in the higher speed range. In an automatic clutch according to the invention which was tested with highly satisfactory results the magnet coil 35 had a direct current resistance of 3.5 ohms, while the resistance of the resistor W was 10 ohms. Under these circumstances the ratio K was about 4.

It will be understood that each of the elements described above or two or more together, may also find a useful application in other types of electromagnetic clutch arrangement differing from the types described above.

While the invention has been illustrated and described as embodied in an automatic electromagnetic clutch arrangement for transmitting variable torques from an engine to the power train of a motor vehicle, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed and desired to be secured by Letters Patent is:

1. In an electromagnetic slip clutch arrangement for operatively connecting a driving and a driven member, in combination, at least two clutching members respectively attached to said driving and driven members; electro-magnetic means cooperating with said clutching members for causing frictional transmission of force between said clutching members with a slippage the extent of which depends upon the variable average value of energization of said electromagnetic means; electric pulse generator means for creating electric pulse sequences at variable frequencies and for applying said pulse sequences to said electromagnetic means for thereby energizing the latter with an average value of energization depending upon the prevailing frequency of said pulse sequences; and means for varying the pulse frequency of said electric pulse sequences created by said pulse genrator means, whereby the extent of slippage, if any, between said clutching members is variable by varying the frequency of the electric pulse sequences applied to the electromagnetic means.

2. In an electromagnetic slip clutch arrangement for operatively connecting the engine of a motor vehicle with its power train, in combination, at least two clutching members respectively connected with the engine and with the power train; electromagnetic means cooperaing with said clutching members for causing frictional transmission of torque between said clutching members with a slippage the extent of which depends upon the variable average value of energization of said electromagnetic means; electric pulse generator means for creating electric pulse sequences at variable frequencies but substantially constant pulse duration and for applying said pulse sequences to said electromagnetic means for thereby energizing the latter with an average value of energization depending upon the prevailing frequency of said pulse sequences; and means for varying the pulse frequency of said electric pulse sequences created by said pulse generator means, whereby the extent of slippage, if any, between said clutching members is variable by varying the frequency of the electric pulse sequences applied to the electromagnetic means.

3. In an electromagnetic slip clutch arrangement for operatively connecting the engine of a motor vehicle with its power train, in combination, at least two clutching members respectively connected with the engine and with the power train; electromagnetic means cooperating with said clutching members for causing frictional transmission of torque between said clutching members with a slippage the extent of which depends upon the variable average value of energization of said electromagnetic means; electric pulse generator means for creating electric pulse sequences at variable frequencies but susbtantially constant pulse duration and for applying said pulse sequences to said electromagnetic means for thereby energizing the latter with an average value of energization depending upon the prevailing frequency of said pulse sequences; and means for determining the pulse frequency of said electric pulse sequences operatively connected with said engine and including electrical means in circuit with said pulse generator means for causing the pulse frequency of said pulse sequences to be in synchronism with the rotary speed of said engine, whereby the extent of slippage, if any, between said clutching members is variable by varying the frequency of the electric pulse sequences applied to the electromagnetic means in accordance with the varying speed of the engine.

4. An arrangement as claimed in claim 3, wherein said pulse generator means include a transistor-equipped monostable multivibrator, and wherein said frequency determining means is capable of delivering trigger pulses in synchronism with revolutions of the crankshaft of said engine to said multivibrator.

5. An arrangement as claimed in claim 4, wherein said engine has an ignition system and said pulse-frequency determining means and said multivibrator are in circuit with said ignition system of said engine for deriving said trigger pulses from the occurrence of the igniting pulses produced by said ignition system.

6. An arrangement as claimed in claim 3, wherein said pulse generator means include a source of constant electric energy as power supply for operating said generator means, and switch means normally connecting the output of said pulse generator means with said electromagnetic means for applying said pulses thereto, and movable to a second position in which said source of constant electric energy is connected with said electromagnetic means for de-energizing the latter by application of said electric energy, and actuating means for moving said switch means to said second position, and control means operatively connected with the moving gear of the vehicle for controlling said actuating means depending on the travel speed of the vehicle in such a manner that said switch means is moved to said second position when said vehicle moves at a speed greater than a predetermined minimum speed.

7. An arrangement as claimed in claim 6, wherein said pulse generator means include second switch means in circuit with said electromagnetic means and movable between a normal position and a second position, for connecting in its normal position the pulse output of said pulse generator with said electromagnetic means so as to cause energization thereof with one polarity, and for connecting in its second position said source of constant electric energy with said electromagnetic means so as to cause energization thereof with opposite polarity, while interrupting the application of said pulses thereto, and to counteract remanent energization thereof after preceding pulse application, and means operatively connected with the gear shift system of the vehicle for causing said second switch means to move to said second position upon actuation of the gear shift whereby the clutch is safely disengaged during gear shifting.

8. An arrangement as claimed in claim 3, wherein said electromagnetic means include a magnet coil in at least one of said clutching members, and means for causing the decay time constant of said coil to be smaller than its build-up time constant, whereby the mean value of the pulse current of said pulse sequences applied thereto is substantially reduced at low pulse frequencies as compared with the mean value of the pulse current at higher frequencies.

9. An arrangement as claimed in claim 8, including a resistor connected in parallel with said magnet coil for reducing the decay time constant thereof, the ohmic resistance value of said resistor being at least equal to the ohmic resistance of said coil.

10. An arrangement as claimed in claim 6, wherein said pulse generator means include means controllable by the pulse output of the generator and capable of eliminating the effect of said control means on said switch means, whereby said pulse sequences are applied to said electromagnetic means also when said vehicle is in motion at a speed larger than said minimum speed.

References Cited in the file of this patent
UNITED STATES PATENTS

| | | |
|---|---|---|
| 2,528,316 | Mayo | Oct. 31, 1950 |
| 2,688,388 | Gill | Sept. 7, 1954 |
| 2,718,157 | Schaub | Sept. 20, 1955 |
| 2,732,447 | Findley | Jan. 24, 1956 |
| 2,747,710 | Smith | May 29, 1956 |
| 2,761,538 | Jaeschke | Sept. 4, 1956 |
| 2,875,744 | Gunkel | Mar. 3, 1959 |
| 2,910,884 | Peras | Nov. 3, 1959 |
| 2,922,503 | Maurice et al. | Jan. 26, 1960 |